(12) United States Patent
Pace (10) Patent No.: US 8,936,060 B2
(45) Date of Patent: Jan. 20, 2015

(54) UNIT FOR APPLYING A LABEL ON A RELATIVE ARTICLE

(75) Inventor: Raffaele Pace, Parma (IT)

(73) Assignee: SIDEL S.p.A. con Socio Unico (IT)

( * ) Notice: Subject to any disclaimer, the term of this patent is extended or adjusted under 35 U.S.C. 154(b) by 399 days.

(21) Appl. No.: 13/517,212

(22) PCT Filed: Dec. 21, 2009

(86) PCT No.: PCT/IT2009/000573
§ 371 (c)(1),
(2), (4) Date: Aug. 31, 2012

(87) PCT Pub. No.: WO2011/077465
PCT Pub. Date: Jun. 30, 2011

(65) Prior Publication Data
US 2013/0008612 A1 Jan. 10, 2013

(51) Int. Cl.
| B65C 3/14 | (2006.01) |
| B65C 3/06 | (2006.01) |
| B29C 63/42 | (2006.01) |
| B29C 53/44 | (2006.01) |

(52) U.S. Cl.
CPC ............... B65C 3/065 (2013.01); B29C 63/426 (2013.01); *B29C 53/44* (2013.01)
USPC ................... 156/568; 156/567; 156/DIG. 13; 156/285; 492/31; 492/33

(58) Field of Classification Search
USPC .................. 156/539, 556, 567, 568, DIG. 11, 156/DIG. 13
See application file for complete search history.

(56) References Cited

U.S. PATENT DOCUMENTS

| 4,302,275 A | 11/1981 | Burmeister et al. | |
| 5,344,519 A * | 9/1994 | Galchefski et al. | ........... 156/456 |
| 5,415,721 A | 5/1995 | Nickey et al. | |
| 2009/0236023 A1* | 9/2009 | Lingier et al. | .................. 156/60 |

FOREIGN PATENT DOCUMENTS

| DE | 9102676 U1 | 5/1991 |
| EP | 2103530 A1 | 9/2009 |

OTHER PUBLICATIONS

"International Application Serial No. PCT/IT2009/000573, International Search Report mailed Sep. 13, 2010", 3 pgs.
"International Application Serial No. PCT/IT2009/000573, Written Opinion mailed Sep. 13, 2010", 4 pgs.
"Machine Translation of DE 9102676U1, published May 23, 1991", 26 pgs.

* cited by examiner

*Primary Examiner* — Mark A Osele
(74) *Attorney, Agent, or Firm* — Schwegman Lundberg & Woessner, P.A.

(57) ABSTRACT

A labelling unit movable along a given path for receiving labels and comprising a hollow receiving member having a lateral wall for receiving a relative label, extending around an axis transverse to the path and comprising a suction portion having through holes; a suction pneumatic device connected to the holes through the inside of the receiving member that can apply suction to retain a label on the outer surface of the lateral wall; and a hollow distributor member coaxially arranged inside the receiving member and provided with a number of angularly spaced opening sections having different heights parallel to the axis and correlated to the heights of different labels processed by the unit, and rotatable in at least two different angular positions, each corresponding to a selected opening section of the suction portion of the lateral wall such that only the holes facing the selected opening section are operative.

7 Claims, 7 Drawing Sheets

UNIT FOR APPLYING A LABEL ON A RELATIVE ARTICLE

PRIORITY CLAIM AND RELATED APPLICATIONS

This application is a nationalization under 35 U.S.C. 371 of PCT/I122009/000573, filed Dec. 21, 2009, and published as WO 2011/077465 A1 on Jun. 30, 2011; which application and publication are incorporated herein by reference in their entirety.

TECHNICAL FIELD

The present invention relates to a unit for applying a label, in particular made of heat-shrinking film, on a relative article, such as a bottle or a generic container, which the following description will refer to, although this is in no way intended to limit the scope of protection as defined by the accompanying claims.

BACKGROUND ART

As it is generally known, labelling machines are used to apply labels to containers or articles of all sort. Typically used with beverage bottles or vessels are tubular labels (commonly called "sleeve labels"), which are obtained by:
  cutting the web unwound from a supply roll into a plurality of rectangular or square labels;
  bending each label in a cylindrical configuration such that the opposite vertical edges overlap one another; and
  welding the overlapped edges of each cylindrical label.

A particular type of labelling machine is known which serves to bend and weld labels in a tubular configuration and to produce insertion of containers into the so formed tubular labels. This kind of machine basically comprises a carousel rotating about a vertical axis to define a circular path, along which it receives a succession of unlabelled containers and, then, a succession of rectangular or square labels from respective input wheels, produces application of the labels in a tubular configuration onto the respective containers and releases the labelled containers to an output wheel.

More specifically, the carousel comprises a number of labelling units which are equally spaced about the rotation axis, are mounted along a peripheral edge of the carousel and are moved by the latter along the above-mentioned circular path.

Each labelling unit comprises a bottom supporting assembly adapted to support the bottom wall of a relative container and an upper retainer adapted to cooperate with the top portion of such container to hold it in a vertical position during the rotation of the carousel about the vertical axis.

Each supporting assembly comprises a vertical hollow supporting mount, secured to a horizontal plane of a rotary frame of the carousel, and a cylindrical receiving member, engaging the supporting mount in sliding and rotating manner with respect to its axis, and adapted to carry a relative container on its top surface and a relative label on its lateral surface.

Each receiving member can be displaced between a raised position and a fully retracted position within the relative supporting mount.

In the raised position, each receiving member protrudes from a top surface of the relative supporting mount and is adapted to receive a relative label on its lateral surface from the label input wheel; in particular the label is wrapped around the receiving member such that the opposite vertical edges of the label overlap one another.

In order to produce this complete wrapping, the receiving member is rotated about its axis during the transfer of the label from the label input wheel.

In the fully retracted position, which is reached at the container input and output wheels, the top surface of each receiving member is flush with the top surface of the supporting mount so that containers are transferred onto and from the carousel along the same transfer plane.

After the welding of the overlapped edges of a tubular label, the displacement of the relative receiving member from the raised position to the fully retracted position produces the insertion of the relative container inside the label, making the so obtained container ready to be transferred to the output wheel.

Each label is retained on the lateral surface of the relative receiving member by suction; in particular, at least a region of the lateral surface of each receiving member is provided with a plurality of holes in turn connected to a pneumatic suction device.

Such region normally has, in a direction parallel to the above-mentioned axis, an extension which is correlated to the height of the label to be processed.

This means that any change of the label format entails a replacement of all the receiving members of the labelling machine, with consequent high costs and long dismantlement and reassemble times.

DISCLOSURE OF INVENTION

It is an object of the present invention to provide a labelling unit, which allows to overcome the above drawback in a straightforward and low-cost manner.

This object is achieved by a labelling unit as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
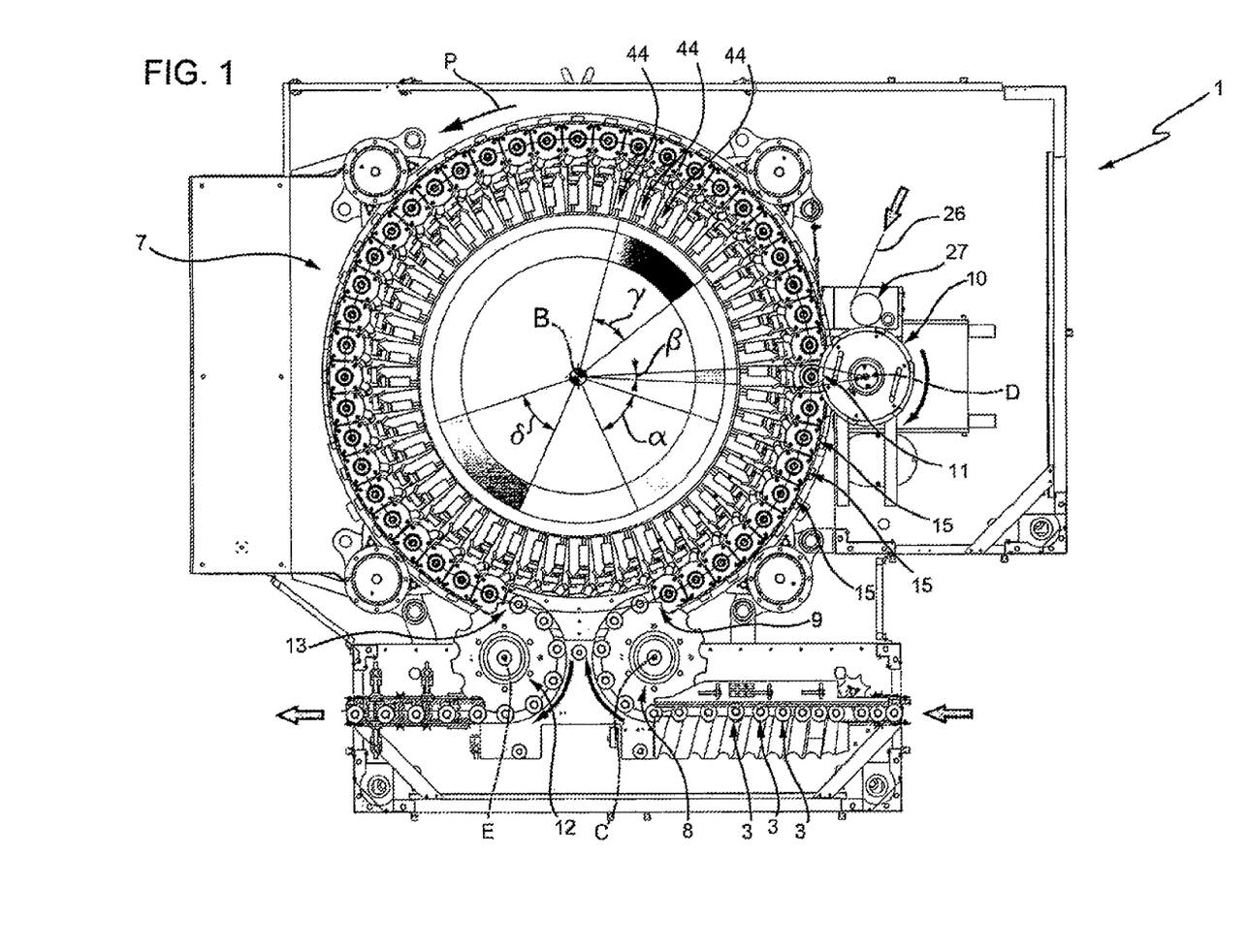
FIG. 1 shows a schematic plan view, with parts removed for clarity, of a labelling machine provided with a plurality, of labelling units in accordance with the teachings of the present invention.

Number 1 in FIG. 1 indicates as a whole a labelling machine for applying labels 2 (FIGS. 2 and 3) to respective articles or more specifically containers, particularly bottles 3, each of which (FIGS. 1 to 3) has a given longitudinal axis A, is bonded at the bottom by a bottom wall 4 substantially perpendicular to axis A, and has a top neck 5 substantially coaxial with axis A.

Machine 1 comprises a conveying device that serves to bend and weld labels 2 in a tubular configuration (FIG. 3) and to produce insertion of bottles 3 into the so formed tubular labels 2.

Figure 2:
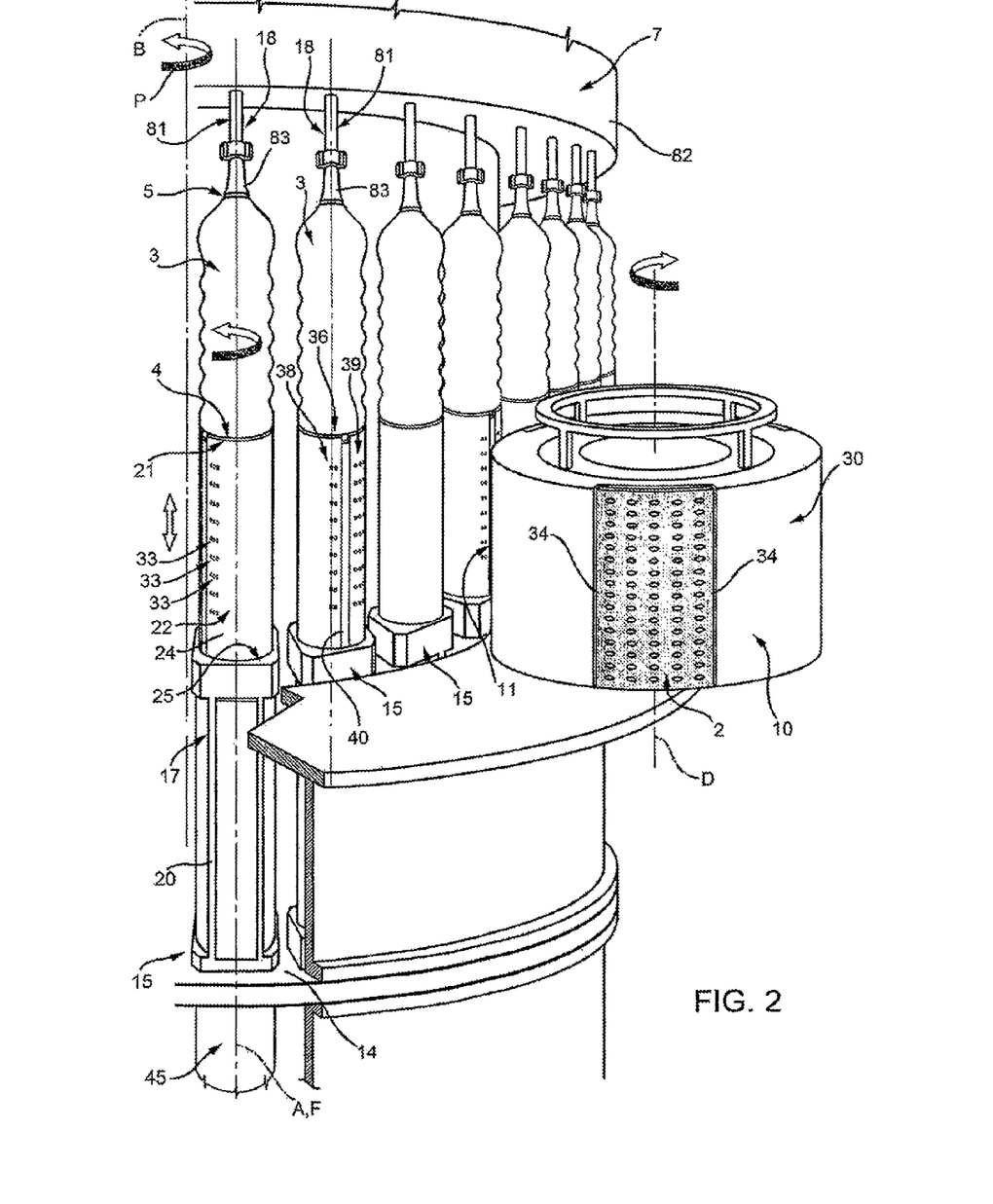
FIGS. 2 and 3 show larger-scale views in perspective of some labeling units of the FIG. 1 labelling machine in proximity of a label transfer station.
Figure 3:
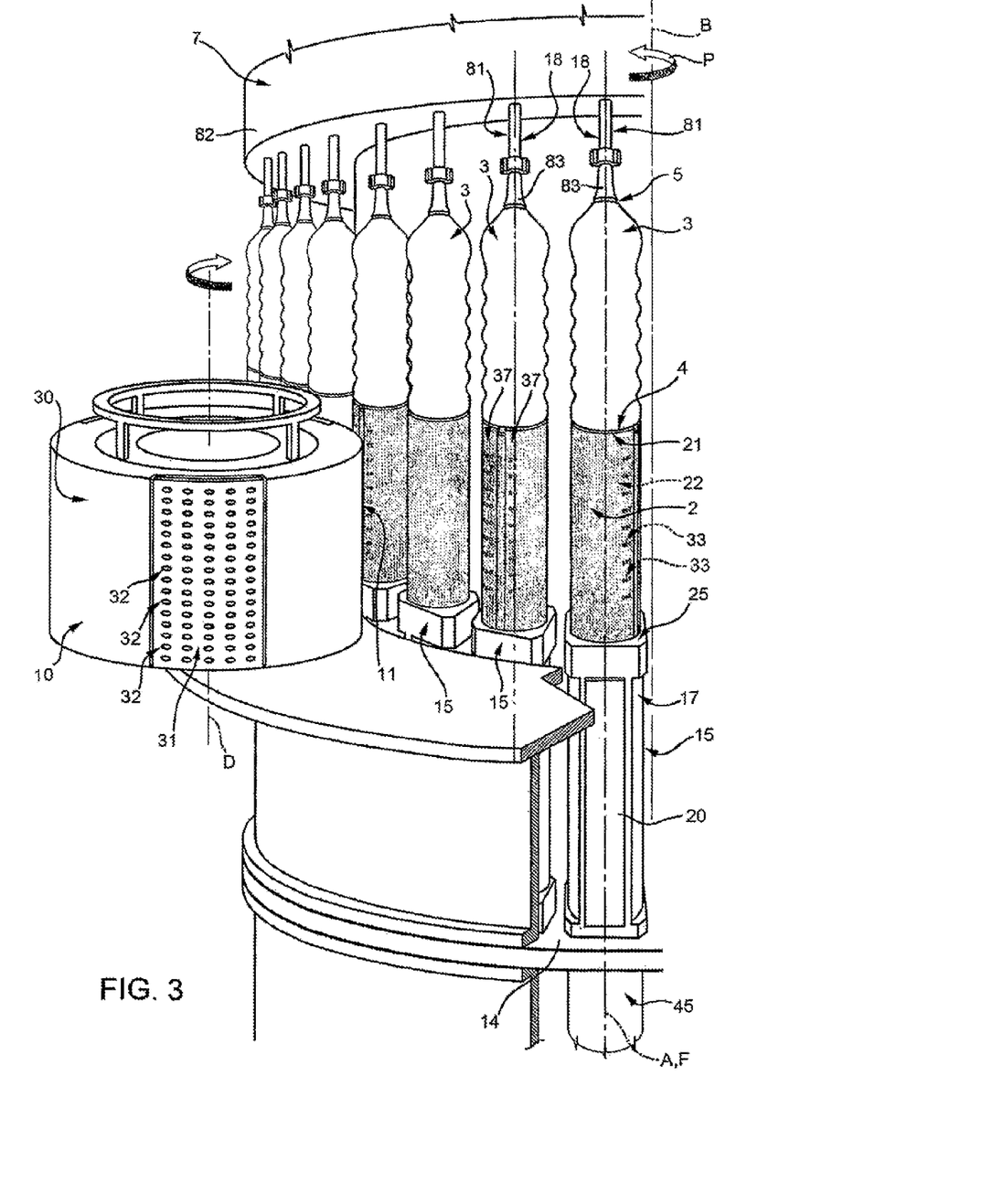
Figure 4:
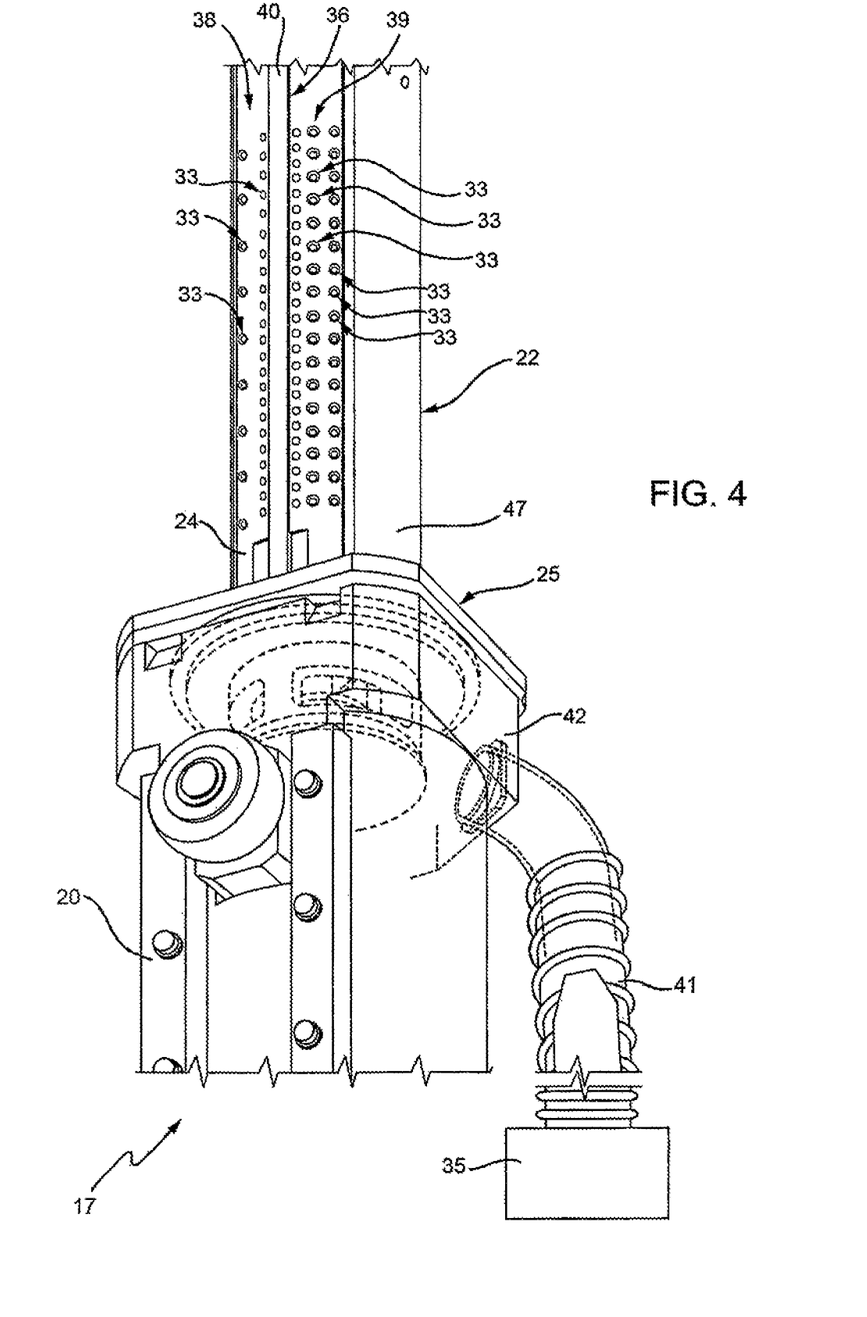
FIG. 4 shows a larger-scale view in perspective, with parts removed for clarity, of a labelling unit according to the present invention.
Figures 5, 6:
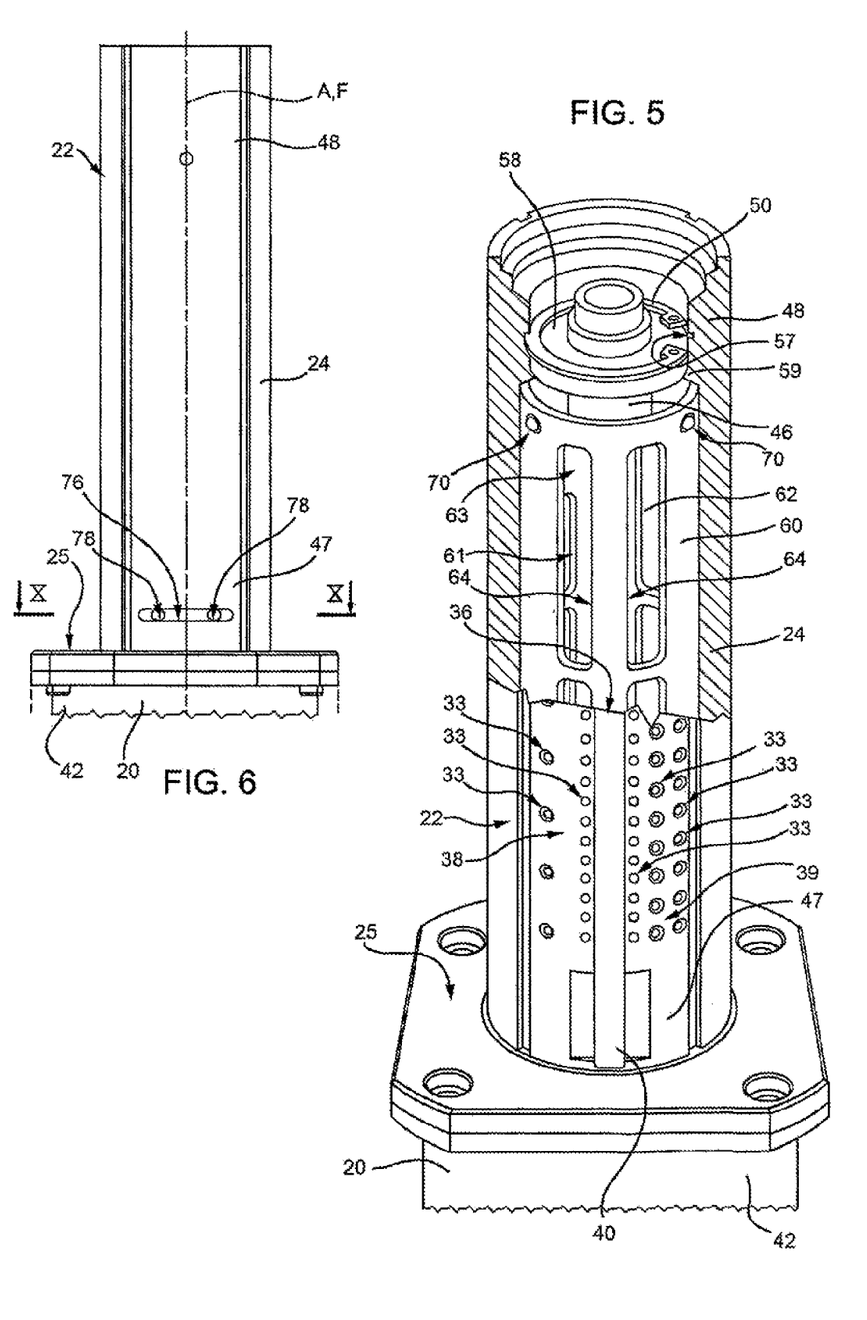
FIG. 5 shows another larger-scale view in perspective, partially sectioned and with parts removed for clarity, of a labelling unit according to the present invention.
FIG. 6 shows a reduced-scale front view, with parts removed for clarity, of the FIGS. 4 and 5 labelling unit.

In the preferred embodiment as illustrated on the FIGS. 1 to 3, the conveying device comprises a carousel 7, which is mounted to rotate continuously (anticlockwise in FIG. 1) about a respective vertical axis B perpendicular to the FIG. 1 plane.

The carousel 7 receives a succession of unlabelled bottles 3 from an input wheel 8, which cooperates with carousel 7 at a first transfer station 9 and is mounted to rotate continuously about a respective longitudinal axis C parallel to axis B.

The carousel 7 also receives a succession of rectangular or square labels 2 from an input drum 10, which cooperates with carousel 7 at a second transfer station 11 and is mounted to rotate continuously about a respective longitudinal axis D parallel to axes B and C.

The carousel 7 releases a succession of labelled bottles 3 to an output wheel 12, which cooperates with carousel 7 at a third transfer station 13 and is mounted to rotate continuously about a respective longitudinal axis E parallel to axes B, C and D.

As shown in FIG. 1, transfer station 11 is arranged, along path P, downstream from transfer station 9 and upstream from transfer station 13.

The carousel 7 comprises a number of operating or labelling units 15, which are equally spaced about axis B, are mounted along a peripheral edge of carousel 7, and are moved by carousel 7 along a circular path P extending about axis B and through transfer station 9, 11 and 13.

With reference to FIGS. 2 and 3, the units 15 are secured to a horizontal rotary table 14 of carousel 7, have respective axes F parallel to axes B, C, D, E and extend coaxially through respective holes (not shown) of the rotary table 14 and on both sides of such table.

Each unit 15 is adapted to receive a relative bottle 3 from input wheel 8 in a vertical position, i.e. coaxially with the relative axis F, and to hold said bottle 3 in such position along path P from transfer station 9 to transfer station 13.

Units 15 being identical to each other, only one is described below for the sake of simplicity and clarity; it is clear that the features described hereafter are common to all the labelling units 15.

In particular, unit 15 comprises, above the rotary table 14 of carousel 7, a supporting assembly 17 adapted to support the bottom wall 4 of a relative bottle 3 and an upper retainer 18 adapted to cooperate with the top neck 5 of the bottle 3.

In particular, supporting assembly 17 comprises:
a hollow supporting mount 20 of axis F, which is secured to a top surface of rotary table 14 around the relative hole thereof; and
a hollow cylindrical receiving member 22, engaging the supporting mount 20 in sliding and rotating manner with respect to axis F, and adapted to carry coaxially a relative bottle 3 on its top end and a relative label 2 on the outer surface of its lateral wall 24.

More specifically, the bottle 3 rests on a support plate 21 (only dimly visible in FIGS. 2 and 3), which is carried by the top end of receiving member 22 through the interposition of a relative bearing (not visible), so as to be angularly free from receiving member 22; in this way, rotational movements of receiving member 22 around axis F are not transmitted to the bottle 3.

Receiving member 22 can be moved along axis F between a fully retracted position within the relative supporting mount 20 and a raised position (FIGS. 2 to 6 and 11).

In the fully retracted position, receiving member 22 is completely housed within the relative supporting mount 20 so that support plate 21 is flush with a top surface 25 of the supporting mount 20.

In the raised position, receiving member 22 protrudes from the top surface 25 of the supporting mount 20 and is adapted to receive, on the outer surface of its lateral wall 24, a relative label 2 from input drum 10.

More specifically labels 2 are cut in a know manner from a web 26 (FIG. 1) by a cutting device 27 (only schematically shown in FIG. 1) and fed to input drum 10 to be then transferred to the relative receiving members 22 in the raised position.

As shown in FIGS. 2 and 3, the cut labels 2 are retained on a lateral surface 30 of input drum 10 by suction; in fact, the lateral surface 30 of input drum 10 is divided into a given number, three in the embodiment shown, of suction regions 31, which are equally spaced about axis D, are each provided with a plurality of through holes 32 connected to a pneumatic suction device (known per se and not shown) and are adapted to cooperate with respective labels 2.

In a completely analogous manner (FIGS. 2-6 and 10), lateral wall 24 of the receiving member 22 is provided with a plurality of through holes 33, in turn connected to a pneumatic suction device 35 (only schematically shown in FIG. 4) so as to retain the relative label 2 on its outer surface by suction.

At the transfer station 11, receiving member 22 can be rotated about the relative axis F in order to produce the complete wrapping of the relative label 2, coming from input drum 10, on the outer surface of its lateral wall 24. In particular, each label 2, fed by input drum 10, is wrapped around the relative receiving member 22 in the raised position so as to form a cylinder with the opposite vertical edges 34 overlapped one another.

More specifically, holes 33 extend only on a given portion 36, hereafter referred to as "suction portion", of lateral wall 24, having an arc-shaped cross section along a plane orthogonal to axis F and sized in the circumferential direction so as to cooperate with opposite vertical end portions 37 of the relative label 2 adjacent to respective vertical edges 34.

In greater detail, suction portion 36 of lateral wall 24 of receiving member 22 is divided into two distinct vertical regions 38, 39 by an elastically deformable, vertical strip pad 40, on which vertical edges 34 of a relative label 2 are placed in an overlapped configuration.

Strip pad 40 defines, in a known manner, the contrasting element for a welding device 44 (known per se and only schematically shown in FIG. 1), arranged in front of, and in a radially inner position than, receiving member 22 and adapted to weld the overlapped edges 34 of the relative label 2 so as to produce a tubular configuration of such label.

Holes 33 are therefore distributed along both regions 38, 39 on opposite sides of strip pad 40 and are connected to pneumatic suction device 35 through the inside of receiving member 22. More specifically, an external conduit 41 (FIG. 4) connects pneumatic suction device 35 to an inner volume of a top portion 42 of supporting mount 20, which is in turn connected with the inside of receiving member 22.

In the light of the above, receiving member 22, during its travel along path P with the other components of unit 15, is subjected to distinct movements in different operative steps of the labelling machine 1:

- a displacement along axis F from the fully retracted position to the raised position, after a bottle 3 has been transferred to unit 15;
- a rotational movement about axis F to receive a relative label 2 from input drum 10 and to allow bending of such label in the cylindrical configuration; and
- a displacement from the raised position to the fully retracted position to allow insertion of the bottle 3 within the label 2 welded in the tubular configuration.

These movements are basically obtained by means of an actuator assembly 45 (only schematically shown in FIGS. 2 and 3), carried by the rotary table 14, and a driving shaft 46 coaxially coupled to the receiving member 22 and actuated by the actuator assembly 45.

In particular, actuator assembly 45 is arranged underneath rotary table 14 and is secured to a bottom surface of the rotary table 14.

Driving shaft 46 extends coaxially through receiving member 22 and is axially and rotationally coupled to bottom and top portions 47, 48 thereof by means of a substantially ring-shaped support element 49 and an elastic ring 50, such as a Seeger ring, respectively.

In particular, support element 49 (FIGS. 10-12) comprises a central portion 51, provided with an axial keyhole 52 for receiving a complementary portion 53 of driving shaft 46, and a peripheral portion 54, which is rotationally fitted within an inner annular groove 55 of bottom portion 47 of receiving member 22 and is provided with a number of through openings or windows 56 for allowing the passage of air in a direction parallel to axis F.

Elastic ring 50 is arranged within an inner annular groove 57 of top portion 48 of receiving member 22 and cooperates with a top surface of a sleeve element 58 externally fitted to driving shaft 46 and whose bottom surface abuts against a protruding inner annular rib 59 of receiving member 22.

The described arrangement makes driving shaft 46 and receiving member 22 axially and angularly coupled to each other, so that any displacement transmitted by actuator assembly 45 to driving shaft 46 results in a corresponding displacement of receiving member 22.

Advantageously (FIGS. 5 to 12), unit 15 further comprises a hollow cylindrical distributor member 60, which is coaxially arranged inside receiving member 22 in a position interposed between pneumatic suction device 35 and holes 33 and is provided with a number of, in the example shown three, angularly spaced opening sections 61, 62, 63 having, in a direction parallel to axis F, different heights H1, H2, H3 (FIGS. 7 to 9) correlated to the heights of different labels 2 adapted to be processed by unit 15 and machine 1.

Distributor member 60 can be rotated, about axis F and with respect to receiving member 22, in a number of, in the example shown three, different angular positions (please see FIGS. 7 to 9), each corresponding to locate a selected opening section 61, 62, 63 in front of suction portion 36 of lateral wall 24 of receiving member 22 so making operative only the holes 33 facing the selected opening section 61, 62, 63.

In particular, distributor member 60 is axially fixed within receiving member 22 between support element 49 and inner annular rib 59 and has an external lateral surface contacting the inner surface of lateral wall 24 of receiving member 22 and which can rotationally slide on the latter.

Preferably, each opening section 61, 62, 63 comprises four adjacent openings or eyelets 64, arranged in pairs in two rows 65 parallel to axis F so that the whole height of the eyelets 64 of each row 65 corresponds to the height H1, H2, H3 of the relative opening section 61, 62, 63. In particular, each eyelet 64 is longer in the direction of axis F than in the circumferential direction about axis F. When one of the opening sections 61, 62, 63 is selected, the eyelets 64 of the relative two rows 65 are arranged so as to cooperate with the respective regions 38, 39 of suction portion 36 of lateral wall 24 of receiving member 22.

Figure 7:
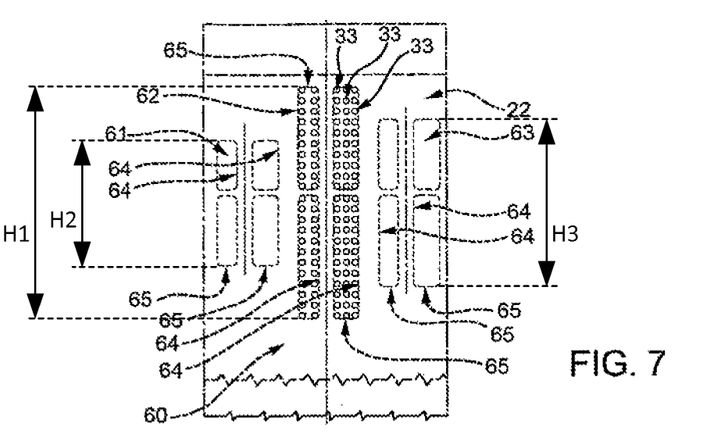
FIGS. 7 to 9 show a detail of the FIGS. 4 and 5 labelling unit, which is represented in different operational modes and as though it were cut open on a plane for the sake of clarity.
Figure 8:
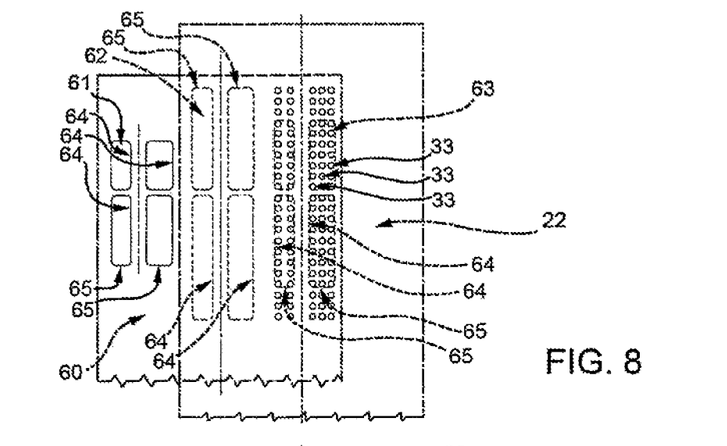
Figure 9:
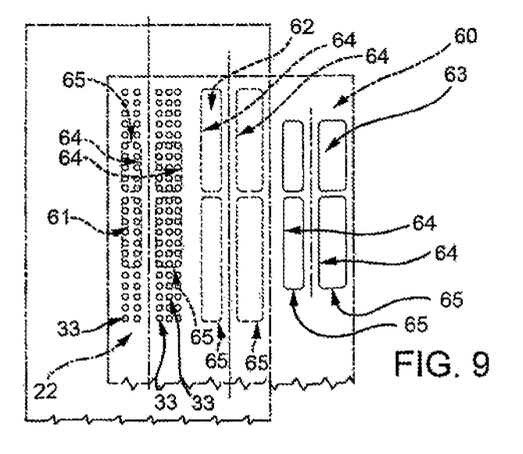

For the sake of clarity, in FIGS. 7 to 9, receiving member 22 and distributor member 60 are represented in the three different relative angular positions as though they were cut open on a plane; in such Figures, it is evident how the selected angular position of distributor member 60 about axis F permits to activate only the holes 33 of receiving member 22 which face the chosen opening section 61, 62, 63. In this way, by simply rotating distributor member 60 about axis F with respect to receiving member 22, it is possible to change the configuration of labelling unit 15 for processing labels 2 of different heights.

Unit 15 further comprises releasable fastening means 70 to couple distributor member 60 to receiving member 22 in each one of the above-mentioned angular positions.

In particular, releasable fastening means 70 comprise a number of, in the example shown three, radial seats 71 provided on top portion 48 of receiving member 22 and angularly spaced from each other about axis F, and one engagement member 72, carried by distributor member 60 and elastically loaded towards an engagement position with one of seats 71 to define a selected one of the different angular positions of distributor member 60.

Figures 10, 11, 12, 13:
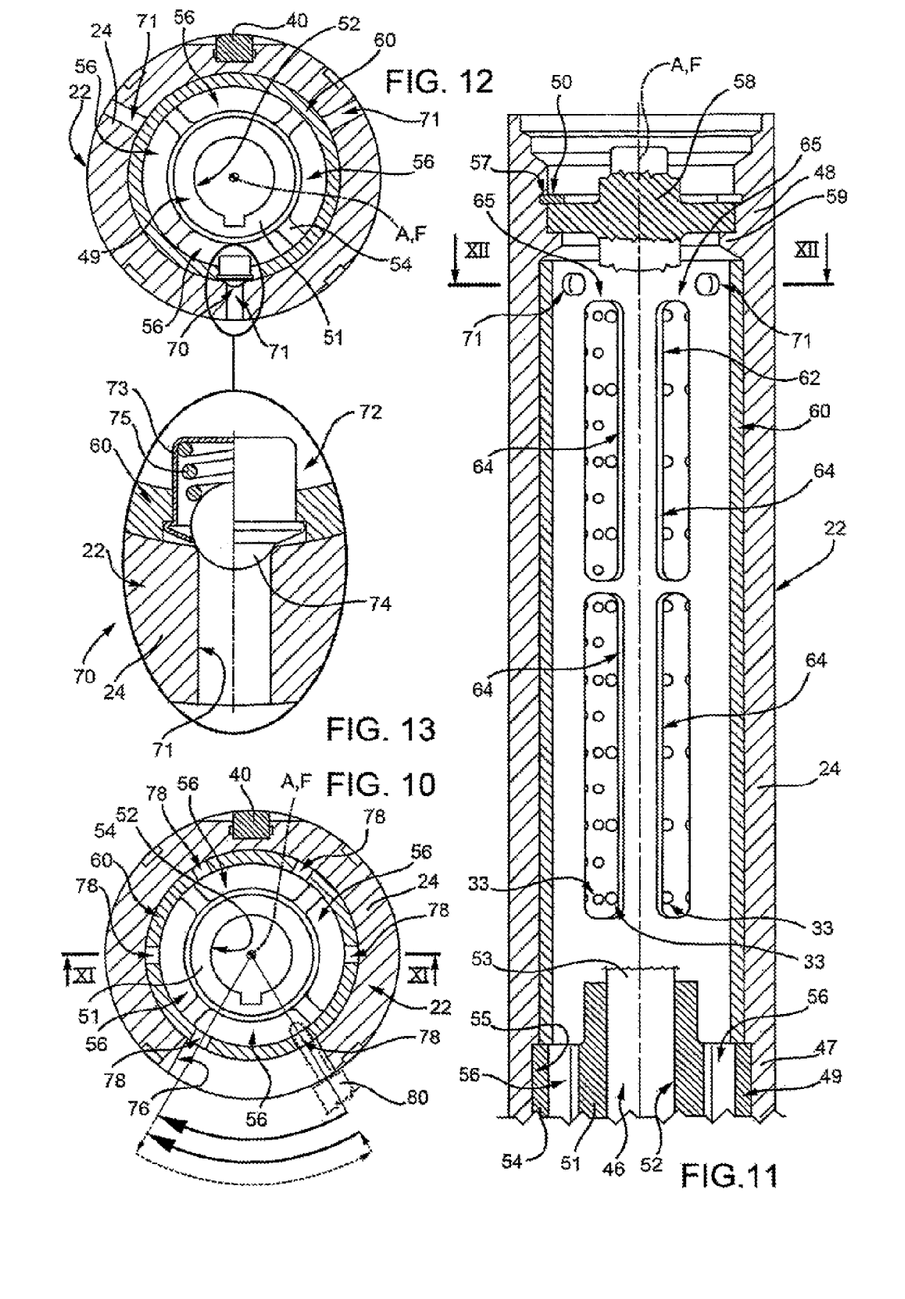
FIG. 10 shows a larger-scale section along line X-X in FIG. 6.
FIG. 11 shows a section along line XI-XI in FIG. 10.
FIG. 12 shows a section along line XII-XII in FIG. 11.
FIG. 13 shows a larger-scale sectional view of a detail in FIG. 12.

More specifically, as shown in detail in FIG. 13, engagement member 72 comprises a substantially cup-shaped housing 73, secured to a radial seat of distributor member 60 in a position in which its open end faces lateral wall 24 of receiving member 22, a spherical coupling head 74 adapted to engage the open end of housing 73, and a helical spring 75, interposed between the coupling head 74 and the end wall of housing 73 opposed to the open end, and which exerts a thrust on the coupling head 74 towards a position protruding from housing 73 and adapted to engage one of seats 71.

In order to allow access to distributor member 60 for rotating it about axis F, bottom portion 47 of lateral wall 24 of receiving member 22 is also provided with a through slot 76 elongated along a circumferential direction with respect to axis F. At the level of slot 76, distributor member 60 is provided with a number of, in the example shown six, radial bores 78 adapted to be engaged by a suitable tool 80 (only schematically shown) from the outside of receiving member 22 through slot 76, so as to produce the rotation of the distributor member 60 about axis F.

Coming back now to FIGS. 2 and 3, the retainer 18, corresponding to the described supporting assembly 17, comprises, in a known manner, a cylindrical movable member 81, which protrudes vertically from an upper rotary portion 82 of carousel 7, can be displaced along the relative axis F and has a bell-shaped free end portion 83 adapted to cooperate with the top neck 5 of the bottle 3 carried by such supporting assembly 17.

More specifically, the displacements of each movable member 81 are controlled in a known manner so as to maintain the same distance between its end portion 83 and the corresponding plate 21, during the movement of the relative unit 15 along the portion of path P from transfer station 9 to transfer station 13, and to increase such distance at transfer stations 9, 13 and during the portion of path P from station 13 to station 9. In this way, bottles 3 are securely hold in their vertical positions during the travel from station 9 to station 13 and are free to be transferred at such stations 9 and 13 from input wheel 8 and to output wheel 12, respectively.

The duration of the most significant operating steps of the machine 1 is schematically shown in FIG. 1 by indicating the corresponding angles of rotation of the carousel 7 about axis B, along which said steps are performed; in particular, angle a refers to the lifting movement of the receiving members 22 from the fully retracted position to the raised position, angle β refers to the label transfer from the input drum 10 to the relative receiving member 22, angle γ refers to the welding operation on the overlapped edges 34 of the tubular labels 2, and angle d refers to the downward movement of the receiving members 22 to produce insertion of the bottles 3 within the corresponding tubular labels 2.

Operation of machine 1 will now be described with reference to the labelling of one bottle 3, and therefore to one labelling unit 15, and as of the instant in which the receiving member 22 of such unit 15 is in the fully retracted position within the relative supporting mount and has just received the unlabelled bottle 3 from input wheel 8.

In this condition, the bottle 3, which rests on plate 21 carried by the receiving member 22, is hold in the vertical position by the combined action of the receiving member 22 and the relative upper retainer 18.

During the subsequent movement of unit 15 along path P (angle a in FIG. 1), the actuator assembly 45 is actuated to move the driving shaft 46 along and about axis F so producing a corresponding rotational-translational movement of the receiving member 22 towards the desired raised position.

At the transfer station 11, the input drum 10 reaches an angular position around axis D adapted to put the label 2 into contact with the receiving member 22 passing through such station; in this condition (angle β), a pure rotational movement of receiving member 22 around axis F is required to produce complete wrapping of the label 2 in a known manner around such receiving member 22 (FIG. 3). More specifically, the label 2 reaches a cylindrical configuration with the opposite vertical edges 34 overlapped one another and arranged on strip pad 40.

At this point, the label 2 is ready to be welded along the edges 34 by activation of the welding device 44 (angle γ).

During the last part of the path P (angle d), the receiving member 22 must be returned to the fully retracted position within the relative supporting mount 20, so as to produce the insertion of the bottle 3 inside the so formed tubular label 2.

A heat-shrinking step (not shown) can be then performed on the bottles 3 exiting from the carousel 7 to obtain shrinking and adhesion of the label 2 to the bottle external surface.

In the case in which it is necessary to change format of the labels 2 to be processed by machine 1, for instance to pass to a new label 2 having a height different from the previously processed one and a length or diameter equal thereto, it is sufficient to act on each unit 15 in order to produce a rotation of the relative distributor member 60 with respect to the receiving member 22 up to the angular position corresponding to put the opening section 61, 62, 63 having the desired height H1, H2, H3 in front of the relative suction portion 36 of the receiving member 22. In this case, holes 33 of the receiving member 22 arranged outside of the outline of the selected opening section 61, 62, 63 of the distributor member 60 are automatically deactivated.

The selection of the desired angular position of the distributor member 60 can be achieved by inserting the tool 78 through slot 76 of the relative receiving member 22 so as to engage one of the bores 78 of the distributor member 60 and by exerting a thrust on such bore in order to produce a rotation of the distributor member 60; by performing such action one or more times, it is possible to reach the desired angular position of the distributor member 60 about axis F.

Releasable fastening means 70 ensure the rotational connection between the receiving member 22 and the relative distributor member 60 in the selected angular position.

The advantages of the labelling units 15 according to the present invention will be clear from the above description.

The new solution permits to use the same labelling unit 15 for processing labels 2 having different heights without any replacement of parts; in particular, the receiving members 22, whose cost is an important factor to take into consideration, are not changed by passing from one label format to another, so permitting a considerable saving.

Moreover, the label format change only requires to perform a rotation of each distributor member 60 with respect to the relative receiving member 22; this operation is clearly easier and faster than the operations of dismantling and reassembling the labelling units.

Clearly, changes may be made to labelling machine 1 and labelling units 15 as described and illustrated herein without, however, departing from the scope of protection as defined in the accompanying claims.

The invention claimed is:

1. A labeling unit movable along a given path for receiving labels to be applied on relative articles, said labeling unit comprising:
   a hollow receiving member having a lateral wall adapted to receive a relative label, extending around an axis transversal to said path and comprising a suction portion provided with through holes;
   a suction pneumatic device connected to said holes through the inside of said receiving member and which can be activated to retain a label on the outer surface of the lateral wall of said receiving member by suction; and
   a hollow distributor member, which is coaxially arranged inside said receiving member in a position interposed between said suction device and said holes, is provided with at least two angularly spaced opening sections having, in a direction parallel to said axis, different heights correlated to the heights of different labels to be processed by the unit, and which can be rotated, about said axis and with respect to said receiving member in at least two different angular positions, each corresponding to locate one of said opening sections in front of said suction portion of said lateral wall of said receiving member so making operative only the holes facing the selected opening section.

2. The labeling unit as claimed in claim 1, further including releasable fastening means to couple said distributor member to said receiving member in the selected one of said angular positions.

3. The labeling unit as claimed in claim 2, wherein said releasable fastening means comprise:
   at least two radial seats provided on one of said receiving member and said distributor member and angularly spaced from each other about said axis; and
   at least one engagement member carried by the other one of said receiving member and said distributor member and elastically loaded towards an engagement position with one of said seats to define the selected one of said angular positions of said distributor member.

4. The labeling unit as claimed in claim 1, wherein said lateral wall of said receiving member is provided with a through slot elongated along a circumferential direction with respect to said axis and adapted to allow access to said distributor member for rotating it about said axis.

5. The labeling unit as claimed in claim 1, wherein each opening section comprises a number of adjacent eyelets.

6. The labeling unit as claimed in claim 1, wherein said distributor member has an external lateral surface contacting the inner surface of the lateral wall of said receiving member and which can slide rotationally on said lateral wall.

7. The labeling unit as claimed in claim 1, wherein said receiving member carries a relative article on its top portion and is supported by a hollow supporting mount in a sliding and rotating manner with respect to said axis; and wherein the unit further comprises actuator means for moving said receiving member along said axis between a raised position, in which said receiving member axially protrudes from said supporting mount and is adapted to receive said article on its top portion and said label in a tubular configuration on said lateral wall, and a retracted position, in which said receiving member is housed within said supporting mount so permitting insertion of said article into said label welded in the tubular configuration.

\* \* \* \* \*